(12) United States Patent
Heiko et al.

(10) Patent No.: US 8,833,732 B2
(45) Date of Patent: Sep. 16, 2014

(54) GLUE VALVE

(75) Inventors: Neudeck Heiko, Verden (DE); Sylvia Rose, Quickborn (DE); Jan Schnakenberg, Blender (DE); Marc-Daniel Stegen, Hamburg (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 0 days.

(21) Appl. No.: 13/256,097

(22) PCT Filed: Mar. 16, 2010

(86) PCT No.: PCT/EP2010/001631
§ 371 (c)(1),
(2), (4) Date: Sep. 23, 2011

(87) PCT Pub. No.: WO2010/112134
PCT Pub. Date: Oct. 7, 2010

(65) Prior Publication Data
US 2012/0313019 A1    Dec. 13, 2012

(30) Foreign Application Priority Data

Apr. 1, 2009 (DE) .......................... 10 2009 015 231

(51) Int. Cl.
*F16K 31/08* (2006.01)
*H01F 7/02* (2006.01)

(52) U.S. Cl.
CPC .................................... *F16K 31/082* (2013.01)
USPC .......................... 251/129.15; 251/65; 335/229

(58) Field of Classification Search
USPC ........ 251/65, 129.15; 335/229–234, 302, 303
See application file for complete search history.

(56) References Cited

U.S. PATENT DOCUMENTS

| | | | | |
|---|---|---|---|---|
| 3,105,511 A | * | 10/1963 | Murphy, Jr. | 137/399 |
| 3,233,625 A | * | 2/1966 | Pase | 137/416 |
| 3,419,008 A | * | 12/1968 | Plishner | 600/31 |
| 4,574,829 A | | 3/1986 | Cummings | |
| 4,883,467 A | | 11/1989 | Franetzki | |
| 5,013,243 A | * | 5/1991 | Tanaka et al. | 433/189 |

(Continued)

FOREIGN PATENT DOCUMENTS

| | | |
|---|---|---|
| DE | 3338111 A1 | 5/1985 |
| DE | 3515848 | * 11/1986 |

(Continued)

OTHER PUBLICATIONS

Bugnion S.p.A. letter to European Patent Office concerning related European patent application (Jan. 24, 2012).

(Continued)

*Primary Examiner* — John K Fristoe, Jr.
*Assistant Examiner* — Jonathan Waddy
(74) *Attorney, Agent, or Firm* — Laurence P. Colton; Smith Risley Tempel Santos LLC

(57) ABSTRACT

A valve for processing glue or other media, the valve having magnets, in particular permanent magnets, that are used for actuating a closure member (16). Two individual magnets (22, 23) located opposite one another are provided, at least in a region which is in contact with the medium or glue, with a protective layer or covering (34), which is preferably designed as a cap and consists of titanium, other metal or plastics material, in order to protect the magnets (22, 23) against the effects of the medium.

13 Claims, 3 Drawing Sheets

(56) References Cited

U.S. PATENT DOCUMENTS

| | | | |
|---|---|---|---|
| 5,254,006 A * | 10/1993 | Yamada | 433/189 |
| 5,337,033 A * | 8/1994 | Kinouchi et al. | 335/302 |
| 5,445,184 A * | 8/1995 | Racine et al. | 137/460 |
| 5,535,919 A * | 7/1996 | Ganzer et al. | 222/1 |
| 6,000,417 A * | 12/1999 | Jacobs | 137/2 |
| 6,040,752 A * | 3/2000 | Fisher | 335/234 |
| 6,158,713 A * | 12/2000 | Ohya et al. | 251/65 |
| 2004/0127852 A1 | 7/2004 | Gray | |
| 2006/0056998 A1 | 3/2006 | Gray | |
| 2006/0169935 A1 | 8/2006 | Yajima | |
| 2008/0223459 A1 * | 9/2008 | Walpole et al. | 137/528 |

FOREIGN PATENT DOCUMENTS

| | | |
|---|---|---|
| DE | 4013323 A1 | 10/1991 |
| DE | 19525820 C1 * | 2/1997 |
| DE | 102007029064 A1 | 12/2008 |
| JP | S5639370 A | 4/1981 |
| JP | S6266061 U | 10/1985 |
| JP | H02168086 A | 6/1990 |
| JP | H07305784 A | 11/1995 |
| JP | H08138932 A | 5/1996 |
| JP | H10238648 A | 9/1998 |
| JP | H10292878 A | 11/1998 |
| JP | H11311357 A | 11/1999 |
| JP | 2001006928 A | 1/2001 |
| JP | 2001141100 A | 5/2001 |
| JP | 2002071050 A | 3/2002 |
| JP | 2006207781 A | 8/2006 |
| WO | 2008155117 A | 12/2008 |

OTHER PUBLICATIONS

Japanese Patent Office, Official Action, Examiner's Objection, in related Japanese Patent Application No. 2012-502484 (Aug. 23, 2013).

State Intellectual Property Office of the People's Republic of China, Notification of the Third Office Action (on related China Patent Application No. 201080014345.2 (Jan. 20, 2014).

* cited by examiner

GLUE VALVE

BACKGROUND OF THE INVENTION

1. Technical Field

The invention relates to a metering valve for flowing media, in particular to a glue nozzle or a glue valve, having a regulating or closure member which can be adjusted by at least one magnet, in particular a permanent magnet.

2. Prior Art

A preferred embodiment of such a valve is illustrated and described in WO 2008/155117. This known valve processes glue, namely in packaging technology, in order for (small) portions of glue to be transferred to folding flaps of (cigarette) packs. In the case of this known valve, a closure member, namely a valve tappet with a spherical closure member at the end of the valve tappet, is activated by permanent magnets, and that is to say is moved into the closed position, with abutment of the closure head against a valve seat. In the case of this prior art, a valve housing contains one magnet in a fixed state and, located opposite this, a magnet which is connected to the valve tappet. These actuating magnets have the same poles, in particular the north poles, facing one another. This generates a repelling magnetic field, which is transmitted to the valve tappet. An electromagnet which can be actuated cyclically moves the valve tappet, counter to the action of the permanent magnets, into the open position of the closure member.

BRIEF SUMMARY OF THE INVENTION

It is an object of the invention to increase the operation or reliability, and extend the service life, of metering valves, in particular of glue valves or glue nozzles.

In order to achieve this object, the valve according to the invention or the nozzle according to the invention is characterized in that the magnet or the magnets or permanent magnets is or are provided, at least in part, with a covering and/or coating which is resistant to the effects of the medium and does not impair the magnetic force.

The invention is based on the knowledge that the processing of aggressive media, in particular of (cold) glue in packaging technology, results in the magnets being altered in an undesired manner if, on account of the construction and operation of the valve, they come into contact with the medium. According to the invention, at least these regions of contact of the magnets are protected by a covering or coating having the above properties.

In the simplest case, the protective covering is arranged in the region of an end surface of the magnet(s). The covering is advantageously designed as cap positioned on the magnet or the cap-like coating, each also extending in the region of side surfaces of the magnet.

Various materials make for a suitable protective covering, for example plastics materials, such as polyester, but also metals. A particularly suitable material is titanium, with surprising results. This material is resistant to glue and other free-flowing media, has low-magnetic properties and enhances the lines of force of the magnetic fields and thus the restoring force of the magnet.

The coating or covering is fastened on the magnet by means of adhesive (adhesive containing one or more components). Furthermore, it is possible for the unit comprising the magnet and coating or covering/cap to be fixed in a recess of a carrier for the magnet by means of anchoring compound.

BRIEF DESCRIPTION OF THE DRAWINGS

Further (special) features of the invention will be explained hereinbelow with reference to exemplary embodiments illustrated in the drawings, in which.

DETAILED DESCRIPTION OF PREFERRED EMBODIMENTS

Figure 1:
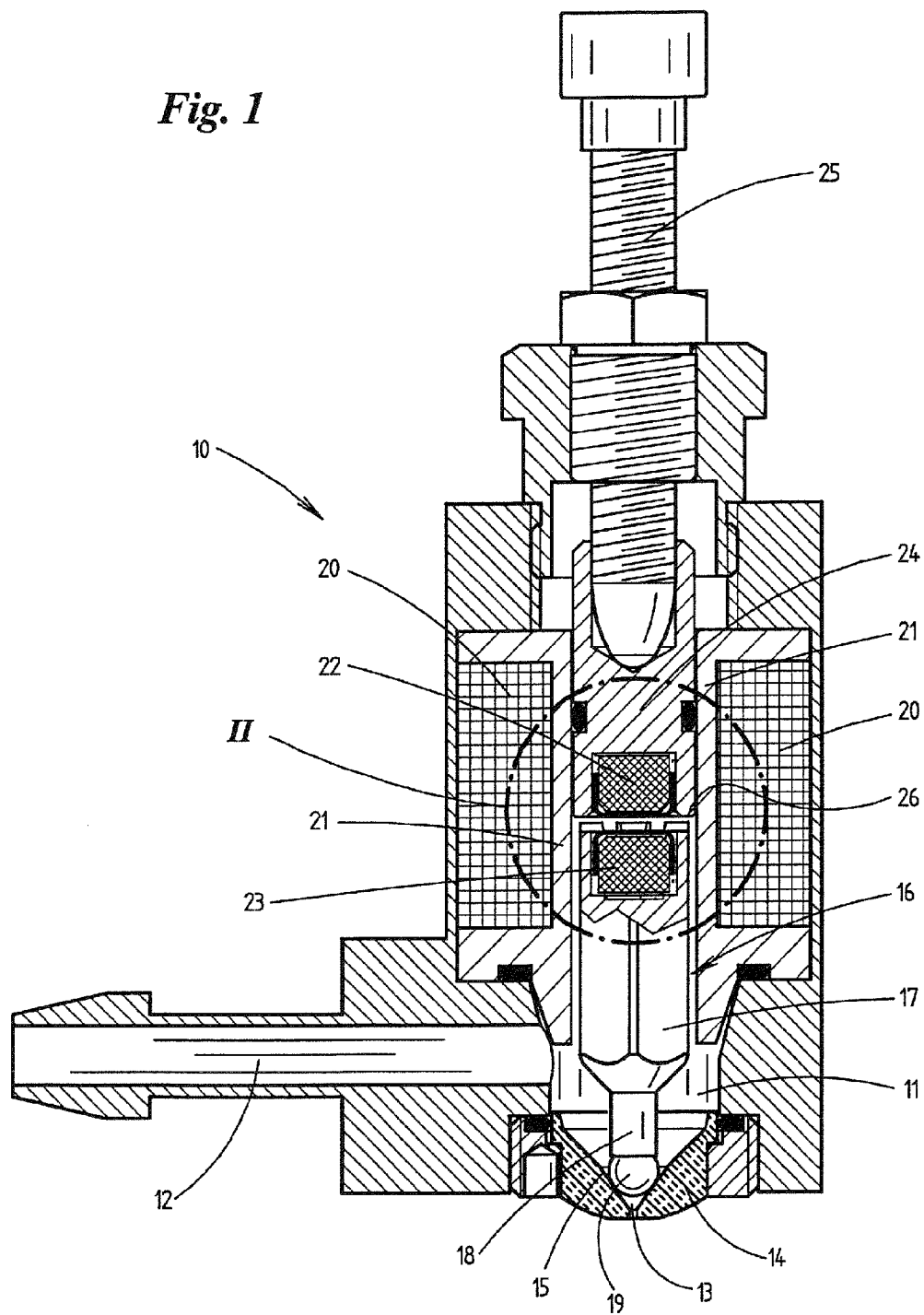
FIG. 1 shows a vertical section through a valve, in particular a glue valve.

FIG. 1 shows an example of a preferred application area of the invention, that is to say a glue nozzle or a glue valve. The latter is used to produce portions of the flowing medium glue and discharge the same onto carriers. In particular, the glue valve is used for transferring portions of glue to folding flaps of packs, preferably in the production of cigarette packs.

The valve comprises a valve housing 10 with a valve chamber 11, to which the medium which is to be processed, that is to say, in particular, glue, is fed, in the present case via a (horizontal) glue channel 12, which opens out in the valve chamber 11.

The medium or the glue exits from the valve via a valve opening 13 in the region of a valve seat 14. The valve seat 14 is designed with a conical seat surface 15 which converges in the downward direction and leads to the central valve opening 13. The latter is assigned a closure member 16, which can be moved longitudinally or vertically within the valve housing 10 between the closed position (FIG. 1) and opening position. The closure member comprises a piston component 17, an intermediate component 18 and a closure component 19, which is fitted on the intermediate component. This closure component has its external shape coordinated with the valve seat 14 or the seat surface 15 and, in the present case, is designed in the form of a sphere. The transverse dimensioning or the diameter of the actuating member 16, that is to say of the piston component 17, is considerably smaller than the corresponding dimensioning of the valve chamber 11. Accordingly, the medium in the valve chamber 11 encloses the piston component 17 and reaches as far as the termination of the valve chamber 11.

Actuating members which are independent of one another are provided for the purpose of actuating a closure member 16, that is to say for moving the latter into the closed position and open position. A first actuating member serves for adjusting the closure member 16 into the open position, according to FIG. 1 by an upwardly directed movement. This actuating member is an electromagnet 20, of which the winding is located in a cross-sectionally U-shaped retaining component 21. The electromagnet 20 is arranged centrally in relation to the valve housing 10 and has a (lower) sub-region enclosing the tappet-closure member 16. Pulse-like activation of the electromagnet 20 causes the closure member 16, and thus the closing component 19, to be moved into an open position.

The closing movement of the closure member 16 is likewise brought about magnetically, to be precise by two individual magnets 22, 23 which are coordinated with one another. These individual magnets are preferably designed as permanent magnets. A first individual magnet 22 is fixed in the valve housing 10, that is to say in a carrying component 24, which bounds the valve chamber 11 opposite the valve seat 14. This carrying component is preferably of cylindrical design and is mounted in a fixed state in a region partially surrounded by the electromagnet 20, but which can be adjusted in order to alter the boundary of the valve chamber 11. For this purpose, the carrying component 24 is connected to an adjusting screw 25 which can be operated from the outside and with the aid of which it is possible to set the relative positioning of the carrying component 24 as the upper stop for the closure member 16. In the open position, in FIG. 1 in the upper end position, this closure member butts against a free end surface 26 of the carrying component 24.

A first (upper) individual magnet 22 is fitted in a recess 27 of the carrying component 24 in a central position in relation to the latter. The individual magnet 22 can be fastened by mechanical connecting members, but preferably by an adhering medium, in particular adhesive 28. The recess 27 is of slightly larger dimensions than the individual magnet 22, and therefore the adhesive 28 encloses the individual magnet 22 fully, but at least in the region of side surfaces 29, and connects the same to an encircling inner wall of the recess 27.

The second individual magnet 23 is fitted opposite the closure member 16, in particular in the region of an end surface or supporting surface 30 of the piston component 17. The latter also has a recess 31, in which the individual magnet 23 is anchored, preferably by adhesive 32. The cross-sectionally preferably cylindrical individual magnets 22, 23 have the same poles, in this case the north poles, facing one another.

The magnets, in this case the individual magnets 22, 23, are protected against being impaired mechanically and/or chemically. In particular, the individual magnets 22, 23 are protected against aggressive media, such as glue in packaging technology. This protection is provided by a covering and/or coating at least in the region of facing magnetic surfaces 33.

Figure 2:
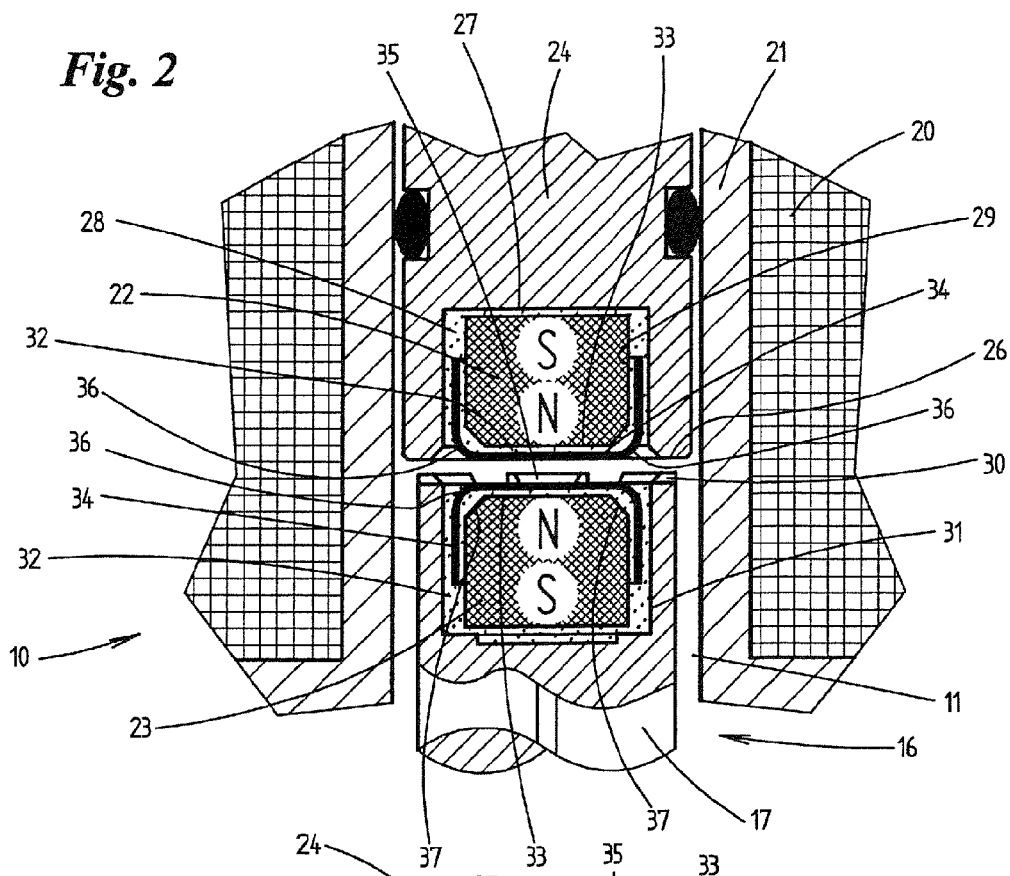
FIG. 2 shows, on an enlarged scale, a detail II of the valve according to FIG. 1.

In the case of the exemplary embodiment according to FIG. 2, the magnetic surface 33 and an adjacent region of the side surface 29 of the individual magnet 22, 23 are provided with a cap-like covering 34. A covering 34 made of metal, in particular titanium, is particularly advantageous. This material can be processed with a very thin wall thickness (e.g. approximately 0.05 mm). Surprisingly, this material has low-magnetic properties and enhances the lines of force of the individual magnets 22, 23. The covering 34 or titanium cap is fastened on the individual magnet 22 or 23 preferably by means of adhesive, in the present case by the adhesive 28, 32 for fixing the magnet 22, 23. The arrangement is such that, in the region of the carrying component 24, the covering 34 is flush with the end surface 26 of the carrying component 24.

It is also the case opposite, in the region of the individual magnet 23, that the covering 34 is flush with the supporting surface 30. In this region, however, individual, encircling ribs 35 are provided, these projecting beyond the supporting surface 30, or beyond the individual magnet 23 and beyond the covering 34, and, in the upper end position of the actuating member 16, butting against the end surface 26, in order to avoid direct contact of the individual magnets 22, 23 or the coverings 34 in the upper end position. For adaptation to the contour of the covering 34 with a round edge 36, the individual magnets 22, 23 are provided with a bevel or chamfer 37 in the region of the magnetic surface 33.

Figure 3:
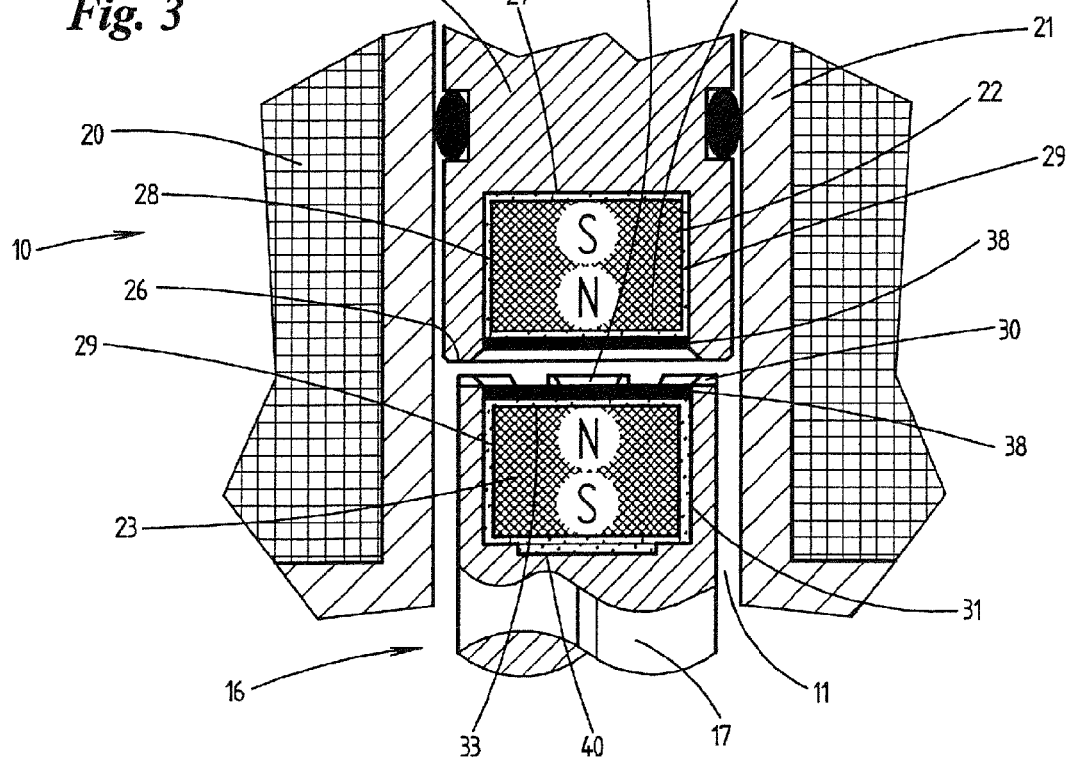
FIG. 3 shows a different exemplary embodiment, in an illustration corresponding to FIG. 2.

The exemplary embodiment according to FIG. 3 differs from that described above by the protective measure for the individual magnet or magnets 22, 23. These magnets are provided, in the region of the magnetic surfaces 33, with a cover plate 38 which extends over the entire cross section of the recess 27, 31. The cover plate 38 is fixed, and connected to the magnetic surface 33, preferably by the adhesive 28, 32. The cover plate 38 consists preferably of titanium, although other metals or plastics material are also suitable. The cover plates 38 are each set back in relation to the end surfaces 26 or the ribs 35, mutual contact thus being avoided. The cover plates 38 are inserted with a close fit into the recess or depression 27 or 31, and therefore the region of the magnets is sealed.

Instead of separate covering means for the magnets 22, 23, the latter may be provided with a protective layer 39 during production of the magnets or following insertion into the necessary position within the valve. This protective layer 39 also has the property of protecting the magnets 22, 23, but not impairing the action thereof. The protective layer 39 preferably consists of a substance which is moldable when applied and hardens permanently thereafter. For example, the protective layer 39 may consists of plastics material (polyester).

Figure 4:
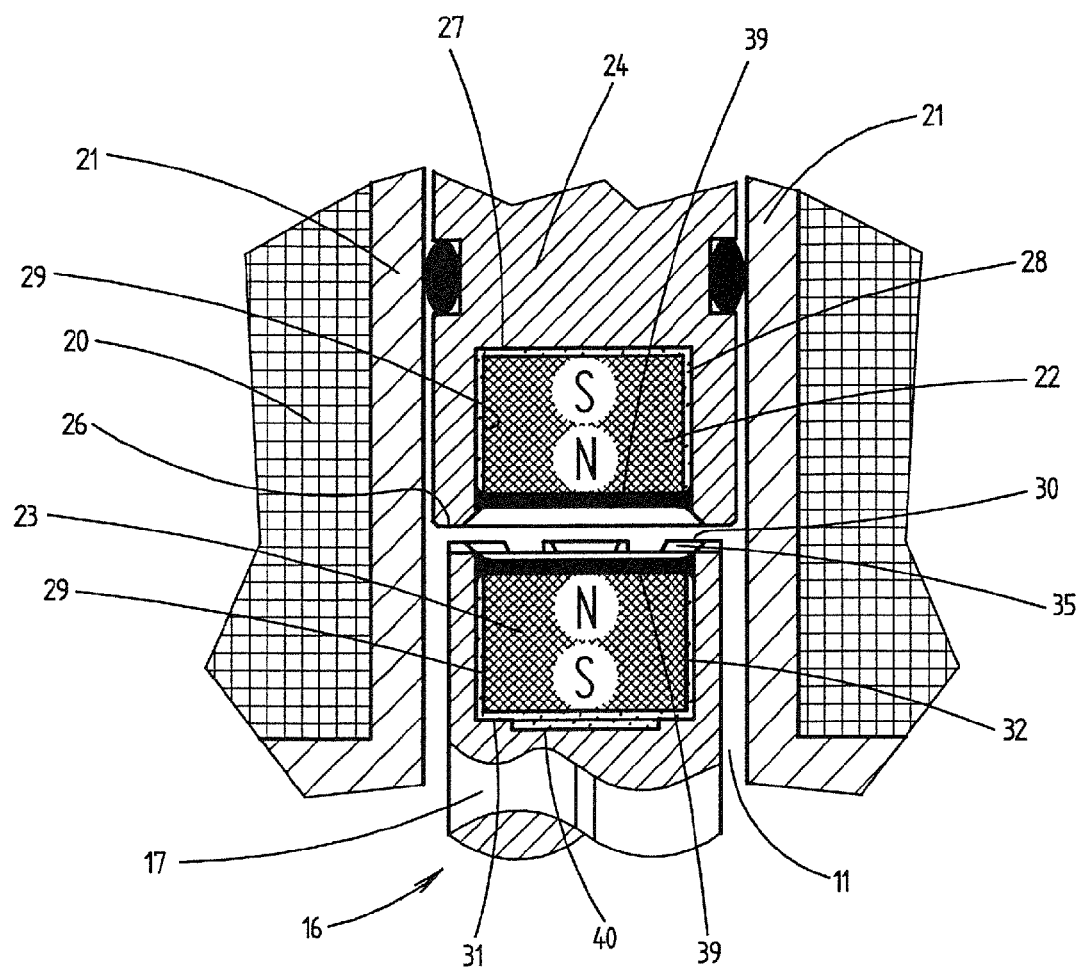
FIG. 4 shows a third exemplary embodiment, in an illustration analogous to FIGS. 2 and 3.

In the case of the exemplary embodiment according to FIG. 4, the protective layer 39 extends over the entire mouth-opening region of the recess 27 or 31. Accordingly, the protective layer 39 adjoins with sealing action of the surface which encloses the recess 27, 31. As an alternative, it is additionally possible for the protective layer 39 to extend in the region of the side surfaces 29 of the magnets or to enclose these to the full extent.

Fitting of the individual magnets 22, 23 preferably proceeds such that the relevant surfaces of the magnets 22, 23 are provided with the connecting coating, that is to say the adhesive 28, 32, and are then inserted into the relevant recess 27, 31. Thereafter, the covering 34, the cover plate 38 or the protective layer 39 is applied. If use is made of the covering 34 or protective layer 39, this can also be applied to the magnets 22, 23 prior to the insertion of the latter into the associated recess 27, 31.

The recess 27, 31, that is to say the region of a base surface thereof, contains a depression 40, into which an excess quantity of adhesive 28, 32 can pass as the magnet 22, 23 is being inserted.

LIST OF DESIGNATIONS

10 Valve housing
11 Valve chamber
12 Glue channel
13 Valve opening
14 Valve seat
15 Seat surface
16 Closure member
17 Piston component
18 Intermediate component
19 Closure component
20 Electromagnet
21 Retaining component
22 Individual magnet
23 Individual magnet
24 Carrying component
25 Adjusting screw
26 End surface
27 Recess
28 Adhesive
29 Side surface
30 Supporting surface
31 Recess
32 Adhesive
33 Magnet surface
34 Covering
35 Rib
36 Round edge
37 Chamfer 38 Cover plate
39 Protective layer
40 Depression

What is claimed is:

1. A metering valve for flowing media, comprising:
two magnets (22, 23);
magnet carriers (17, 24) each having a respective recess (27, 31) for carrying a respective one of the magnets (22, 23); and
a regulating or closure member (16) that is adjustable by the magnets (22, 23),
wherein:
each of the magnets (22, 23) is fastened in the respective recesses (27, 31) of the magnet carriers (17, 24) by adhesive (28, 32);
one of the magnets (22) is stationary relative to the respective magnet carrier (24) in which the one of the magnets (22) is carried and another of the magnets (23) is connected to the regulating or closure member (16);
the magnets (22, 23) are aligned with one another with the same poles facing one another;
the regulating or closure member (16) is adjustable by virtue of a cyclically operating electromagnet into an opening position counter to a pole action of the magnets (22, 23); and
the magnets (22, 23) comprise, at least in part, a covering and/or coating (34, 38, 39) which is resistant to the effects of the flowing media and does not impair the magnetic force of the magnets, the covering and/or coating (34, 38, 39) being in a region of an end of the respective recess (27, 31), the magnet carrier (17) which carriers the magnet that is connected to the regulating or closure member (16) is provided with encircling ribs (35) that project in the direction of the other magnet carrier (24) beyond the magnet (23) and covering (34) on said magnet carrier provided with the ribs.

2. The valve as claimed in claim 1, wherein the magnets (22, 23) comprise the covering and/or coating (34, 38, 39) at least in the region of a free end surface of the magnets (22, 33) facing the media or a magnetic surface (33).

3. The valve as claimed in claim 1, wherein the covering and/or coating (34, 38, 39) is a covering (34) or a cover plate (38) that consists of metal.

4. The valve as claimed in claim 2, wherein the covering and/or coating (34, 38, 39) is a cap which covers the free end surface or the magnetic surface (33) of the magnet (22, 23) and at least adjacent regions of side surfaces (29) of the magnet (22, 23).

5. The valve as claimed in claim 3, wherein the covering (34) is made of titanium and has a layer thickness or wall thickness of approximately 0.05 mm.

6. The valve as claimed in claim 3, wherein the covering (34) or the cover plate (38) is fastened on the magnet (22, 23) by adhesive.

7. The valve as claimed in claim 1, wherein the covering and/or coating (34, 38, 39) is a protective layer (39) that is applied to the magnets (22, 23).

8. The valve as claimed in claim 1, wherein at least one of the recesses (27, 31) of the magnet carriers (17, 24) comprises a base which has a depression (40) for receiving excess adhesive-bonding or embedding compound, and the magnet (22, 23) is supported on the base.

9. The valve as claimed in claim 1, wherein the magnets (22, 23) are permanent magnets.

10. The valve as claimed in claim 3, wherein the metal is titanium.

11. The valve as claimed in claim 7, wherein the protective layer is made of plastic material or metal.

12. The valve as claimed in claim 2, wherein the magnets (22, 23) are arranged in the respective recesses (27, 31) of the magnet carriers (17, 24), and wherein the covering and/or coating is a cover plate (38) which has an anchor fit in the respective recess (27, 31).

13. The valve as claimed in claim 7, wherein the protective layer (39) is made of an initially free-flowing or moldable material which hardens on, and adheres to, the magnets (22, 23).

* * * * *